United States Patent
Goeggelmann et al.

(10) Patent No.: US 8,727,379 B2
(45) Date of Patent: May 20, 2014

(54) MOBILE WORK MACHINE COMPRISING A BRACING DEVICE

(75) Inventors: Gernot Goeggelmann, Nuertingen (DE); Wolf-Michael Petzold, Aichwald (DE); Michael Neubert, Aichtal (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 13/978,415

(22) PCT Filed: Apr. 5, 2012

(86) PCT No.: PCT/EP2012/056259
§ 371 (c)(1),
(2), (4) Date: Jul. 5, 2013

(87) PCT Pub. No.: WO2012/150106
PCT Pub. Date: Nov. 8, 2012

(65) Prior Publication Data
US 2013/0277954 A1    Oct. 24, 2013

(30) Foreign Application Priority Data
May 5, 2011    (DE) .......................... 10 2011 075 310

(51) Int. Cl.
*B60S 9/02*    (2006.01)

(52) U.S. Cl.
USPC ..................................................... 280/763.1

(58) Field of Classification Search
USPC ......... 701/49–50, 124; 73/788, 760; 254/418, 254/420
See application file for complete search history.

(56) References Cited

U.S. PATENT DOCUMENTS

| | | | |
|---|---|---|---|
| 6,351,696 B1 * | 2/2002 | Krasny et al. | 701/50 |
| 7,012,540 B2 * | 3/2006 | Petzold et al. | 340/679 |
| 7,784,354 B2 * | 8/2010 | Gelies | 73/788 |

FOREIGN PATENT DOCUMENTS

| | | |
|---|---|---|
| DE | 92 03 923 U1 | 6/1992 |
| DE | 42 31 441 A1 | 3/1994 |
| DE | 197 10 341 A1 | 9/1998 |
| DE | 100 04 329 A1 | 8/2001 |
| DE | 101 10 176 A | 9/2002 |
| DE | 103 49 234 A | 5/2005 |
| DE | 10 2004 012 966 A1 | 10/2005 |

(Continued)

OTHER PUBLICATIONS

International Search Report of PCT/EP2012/056259, mailed Jul. 6, 2012.

(Continued)

*Primary Examiner* — John Walters
*Assistant Examiner* — James Triggs
(74) *Attorney, Agent, or Firm* — Collard & Roe, P.C.

(57) ABSTRACT

A mobile work machine includes a chassis that has a traveling gear and a bracing device that is arranged on the chassis and can be braced on a support such as to raise the chassis. The traveling gear includes at least one traveling gear part, the relative position and/or inclination of which with respect to the chassis can be varied during the bracing process. At least one position or inclination sensor is arranged on the traveling gear part, the output signal of the sensor being an actual measure of the position or the inclination of the traveling gear part relative to a reference system that is stationary on the chassis or stationary on the ground. In addition, an evaluation unit is provided, which responds to the output signal of the at least one position or inclination sensor.

10 Claims, 4 Drawing Sheets

(56) References Cited

FOREIGN PATENT DOCUMENTS

Figure 1A:
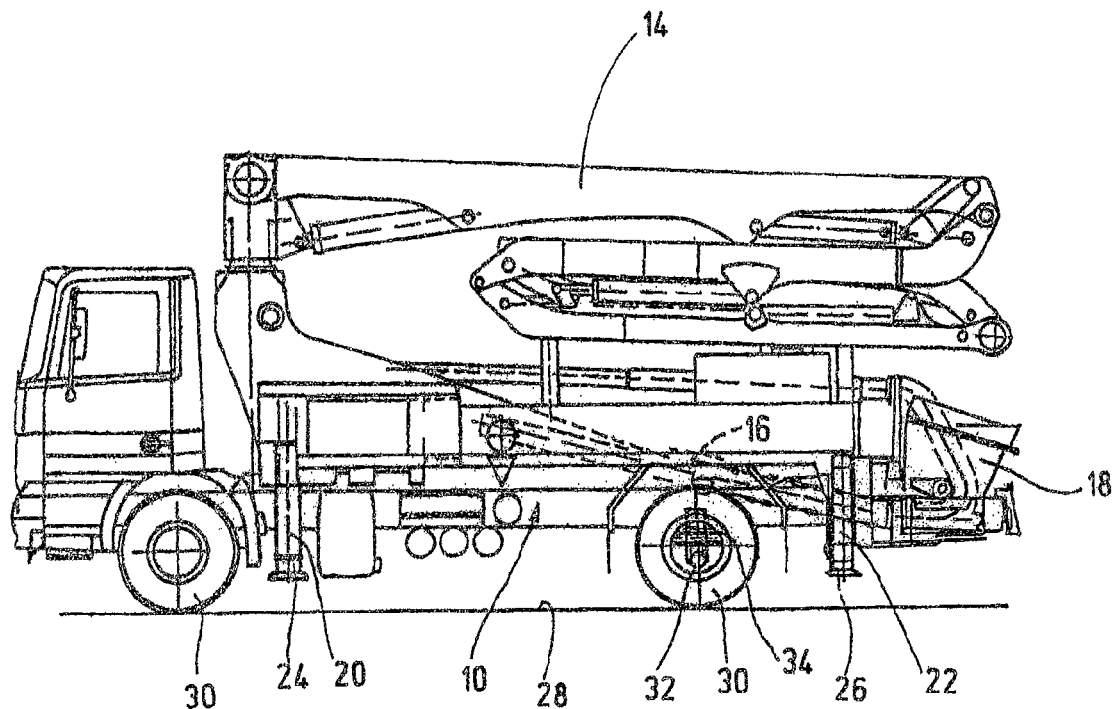

| | | |
|---|---|---|
| DE | 10 2007 030 107 A1 | 1/2009 |
| EP | 1 849 931 A2 | 10/2007 |
| GB | 2 271 100 A | 4/1994 |
| WO | WO 2010/003636 A1 | 1/2010 |

OTHER PUBLICATIONS

German Search Report dated Feb. 28, 2012 in German Application No. 10 2011 075 310.9 with English translation of the relevant parts.
M. Wolfram, "Autobetonpumpen mit Großmast," Zeitschrift "Beton" (Journal "Concrete") Jun. 1996, pp. 362-364.

* cited by examiner

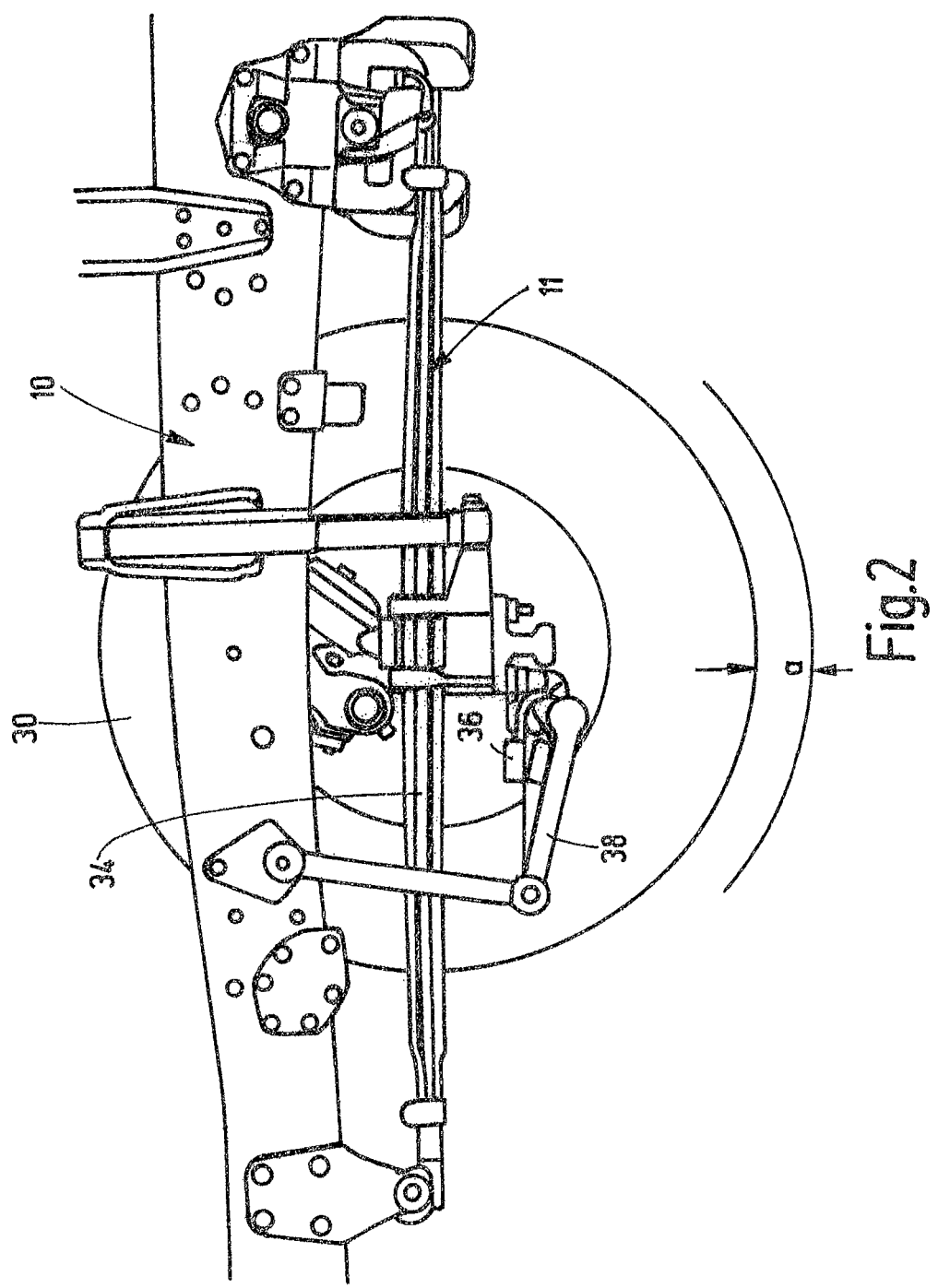

MOBILE WORK MACHINE COMPRISING A BRACING DEVICE

CROSS REFERENCE TO RELATED APPLICATIONS

This application is the National Stage of PCT/EP2012/056259 filed on Apr. 5, 2012, which claims priority under 35 U.S.C. §119 of German Application No. 10 2011 075 310.9 filed on May 5, 2011, the disclosures of which are incorporated by reference. The international application under PCT article 21(2) was not published in English.

The invention relates to a mobile work machine, in particular a truck-mounted concrete pump, with a chassis comprising a running gear and a bracing device disposed on the chassis and able to be braced on a base so as to raise the chassis. The chassis comprises the supporting parts of the mobile work machine. The running gear is attached to the chassis and comprises all movable parts that are used to make contact with the highway. In particular the running gear comprises the wheels, wheel suspension, springs, shock absorbers and similar running gear parts.

Work machines of this type are known that are provided with deployable supporting struts as a bracing device, which are intended to improve the stability of the working equipment at the point of use. The object of the supporting struts on the one hand is to eliminate the vehicle suspension and to raise the wheels from the base. On the other hand the supporting struts are intended to reduce the risk of tilting, which arises if there is a high tilting moment on a working jib. In order to ensure safeguarding against tilting, in the case of a truck-mounted concrete pump with distributor boom, a monitoring device has already been proposed (Journal "Concrete" 6/96, pages 362, 364). In this the pressures occurring in four hydraulically operated telescopic cylinders of the supporting struts are monitored. If the pressure in two supporting strut cylinders decreases, the boom movements and the boom pump are switched off. However, investigations have shown that pressure measurements in the telescopic cylinders of the supporting struts are not sufficient for reliable supporting strut monitoring. Above all this applies if one of the supporting strut cylinders is moved against a stop. Also dynamic bracing effects cannot be detected with said monitoring system. In order to avoid said disadvantages, it has already been proposed (DE-A 101 10 176) that a pair of force sensors is disposed in the foot part of each supporting strut. Each force sensor is disposed there in an electrical measurement circuit for outputting a bracing load-dependent measurement signal, wherein the monitoring device comprises evaluation electronics that can be subjected to supporting strut-related supporting load measurement values and to their comparison with at least one specified stability-determining threshold value in specified working cycles. Furthermore, it is known for a mobile work machine of the type specified above (DE-A 103 49 234) that for supporting struts for which telescopic supporting legs with a telescopic element fixed to the strut are linked to a supporting strut box by means of a linkage bolt, the linkage bolt is designed as a measurement element for determining the supporting load. In this case the linkage bolt carries at least one strain gauge for determining bolt bending or the elastic shear strain. Machines having supporting force monitoring of this type can detect the total weight supported by the supports from the sum of their determined weight load. This enables a conclusion to be drawn regarding the lifted machine weight and ultimately regarding an indication of the lift by means of a comparison with a stored target weight. For machines having no supporting force monitoring, there have to date been no measures to allow the recognition of whether the machine is raised sufficiently above the ground in the working position. For an only partly raised machine, the weight applied to the ground by the tires is lacking in the stability equation. This has negative consequences up to tilting of the machine depending on the degree of the reduction in loading.

On this basis it was proposed according to the invention to provide technical measures for working machines that enable an indication of the lift in the operating state.

In order to achieve this object, the features specified in claim 1 were proposed. Advantageous embodiments and developments of the invention will become apparent in the dependent claims.

The solution according to the invention is based on the idea that the running gear comprises at least one running gear part whose relative position and/or tilt relative to the chassis is variable during the bracing process. In order to enable an indication of the lift during the bracing process, it is proposed according to the invention that at least one position sensor or tilt sensor is disposed on said running gear part, whose output signal forms an actual measure of the position or the tilt of the running gear part relative to a reference system that is fixed relative to the vehicle or to the Earth, and that in addition an evaluation unit responding to the output signal of the at least one position sensor or tilt sensor is provided for determining a measurement value for the bracing state or the lifting state of the chassis.

Advantageously, the evaluation unit comprises a comparator for carrying out a comparison of the at least one actual measure for the position or the tilt of the running gear part with a respective specified target value, whose output signal forms the numerical measure for the bracing state or lifting state of the chassis.

In order to improve the reliability of the lifting indication, a redundant tilt sensor or position sensor is assigned to each tilt sensor or position sensor.

A preferred embodiment provides that the tilt sensor is disposed on an angle changing running gear part, e.g. in the form of a control arm or of a stabilizer.

Another variant of the invention consists in that the position sensor is disposed on a distance-changing running gear part, e.g. in the form of a shock absorber or of a wheel suspension element.

The position sensor can be e.g. in the form of a distance sensor or of a proximity sensor that is aligned with a reference section that is fixed relative to the chassis or to the Earth. Alternatively, the position sensor can be in the form of a distance sensor or a proximity sensor disposed at a point that is fixed relative to the chassis, which is aligned with a reference section that is fixed relative to the running gear or to the Earth. The reference section that is fixed relative to the running gear can thereby be disposed on a shock absorber or on a wheel suspension element. For example, a control cable sensor, an ultrasonic source or a laser light source is considered as a signal source for the distance sensor.

With the measures according to the invention it is achieved that even work machines without integrated stability systems can be retrospectively equipped with monitoring elements that provide a reduction of the potential risk in relation to incorrect bracing and thereby prevent accidents that are caused by a lack of stability.

The invention is explained in detail below using the figures. In the figures

Figure 3A:
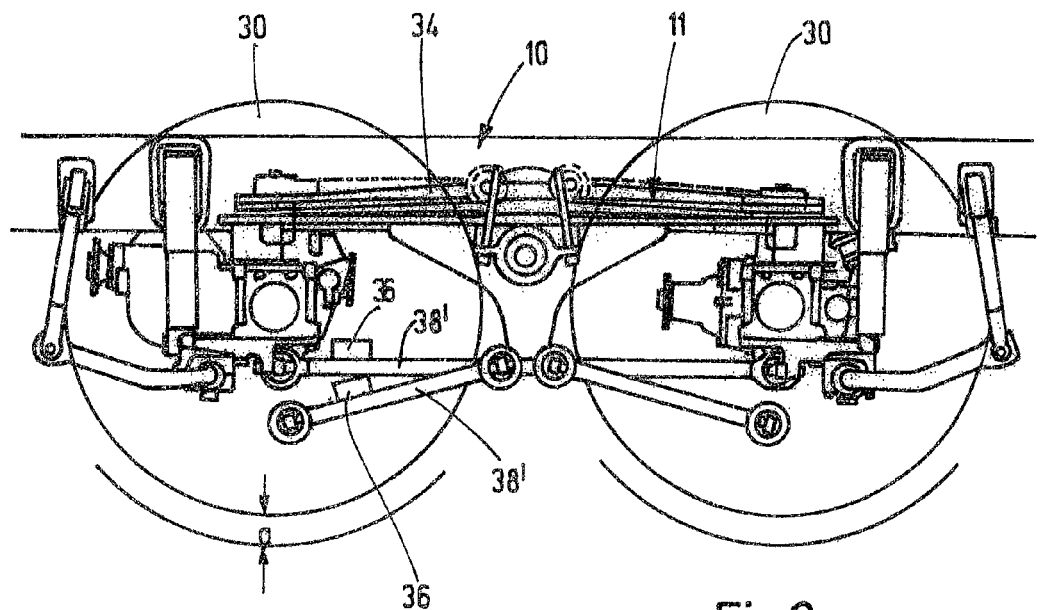
Figure 4:
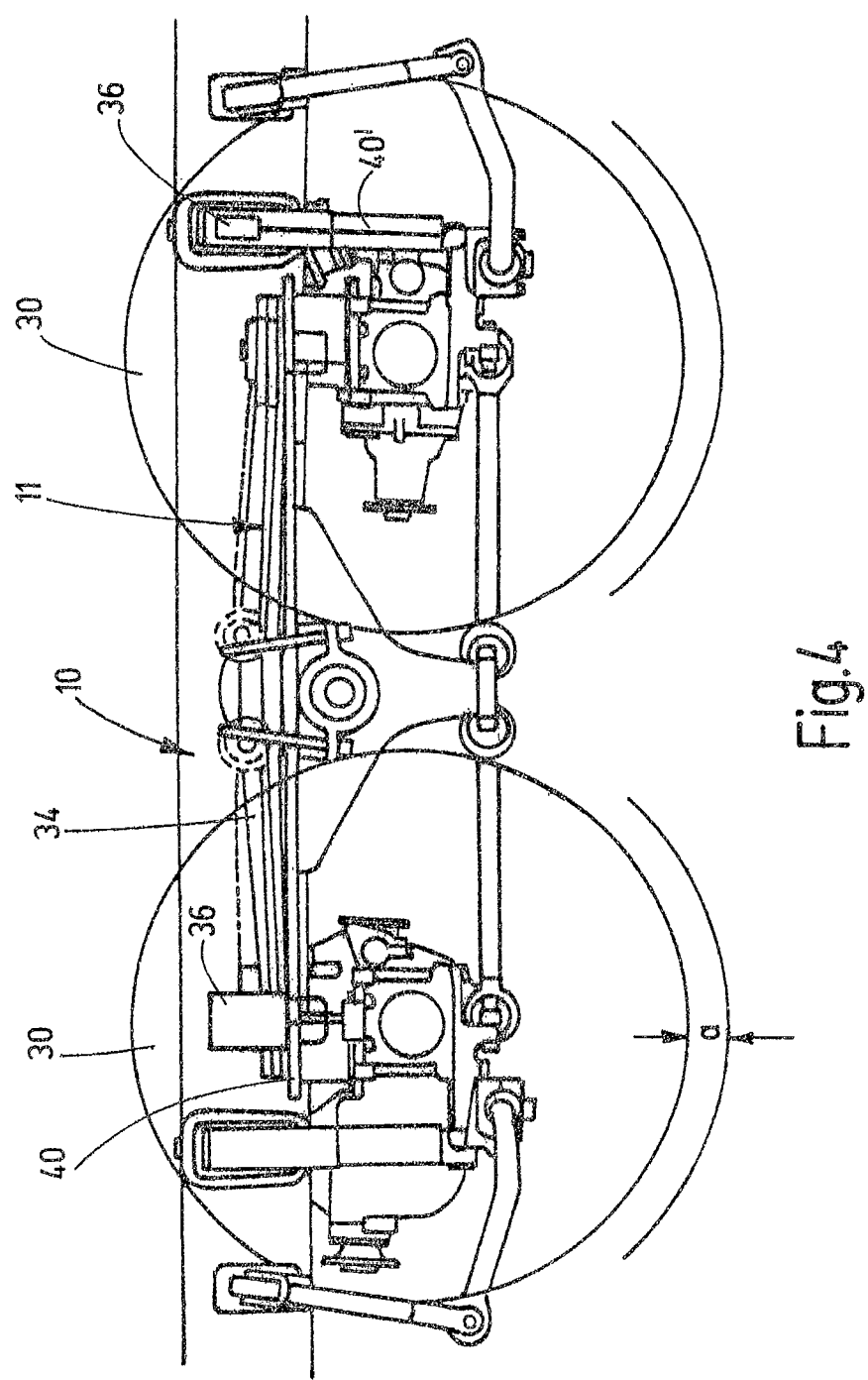

FIGS. 1a and b show a lateral view of a truck-mounted concrete pump in the driving position and in the raised working position;

FIG. 2 shows a lateral view of a running gear part with a front-axle-located stabilizer in the lowered position and in the lifting position;

FIGS. 3a and b show a lateral view and a plan view of a running gear part with triangular rear axle control arms in the lowered position and in the lifting position;

FIG. 4 shows a lateral view of a running gear part with distance sensors in the area of a wheel suspension element and of a shock absorber.

Figure 1B:
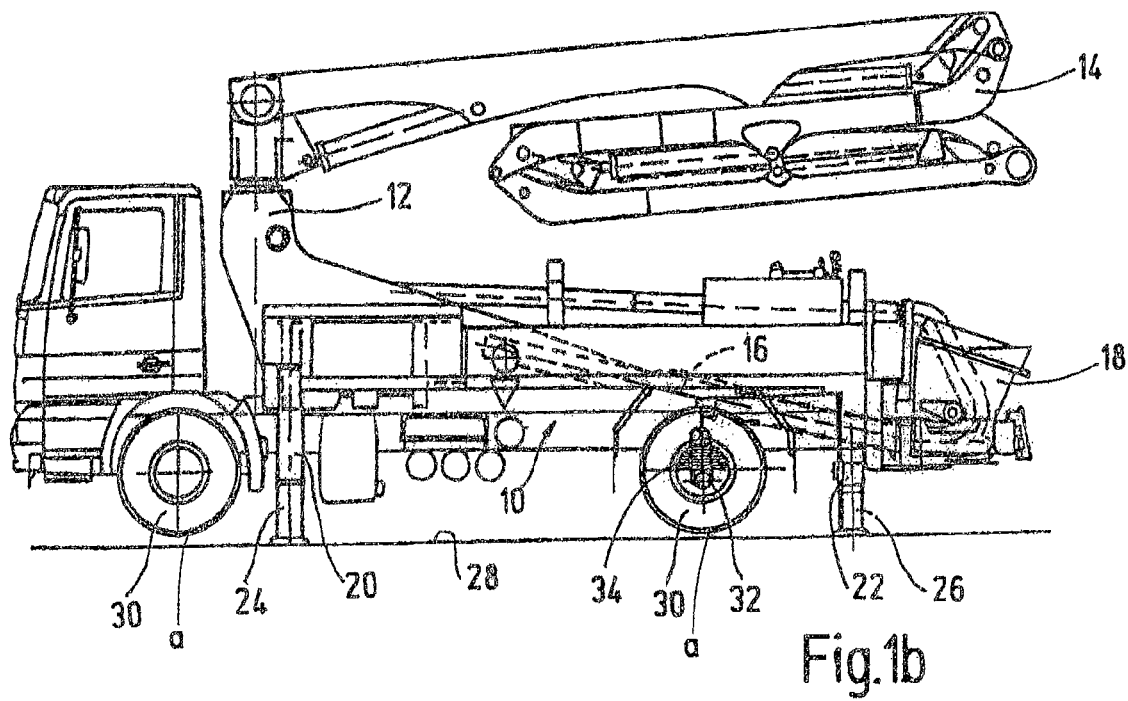

The mobile work machine illustrated in FIG. 1a in the driving position and in FIG. 1b in the raised working position and designed as a truck-mounted concrete pump consists essentially of a two-axle chassis 10, a concrete distribution boom 14 mounted on a boom base 12 close to the front axle so as to rotate about a vertical axis, a thick matter pump 16 with a material output container 18 and a bracing device consisting of two front supporting legs and two rear supporting legs 20, 22. The supporting legs 20, 22 can be supported on the ground 28 in each case by a downward deployable foot part 24, 26 to raise the chassis 10 and the running gear 11 attached thereto. As can be seen from FIG. 1a and FIG. 1b, the wheels 30 of the rear axle 32 are suspended on the chassis 10 with the intermediate disposition of wheel springs 34 pretensioned by the action of the axle load. The wheel springs 34 are in the form of layered leaf springs in the exemplary embodiment shown.

A particular feature of the invention is that a position sensor or tilt sensor 36 is disposed on a running gear part 38, 38', which is changed in its relative position or tilt relative to the chassis 10 by the bracing device 20, 22 during the bracing process of the work machine, the output signal of said sensor forming an actual measure for the position or the tilt of the running gear part relative to a reference system that is fixed in relation to the vehicle or to the Earth. In addition, an evaluation unit is provided, which is not shown in the figure, which responds to the output signal of the at least one position sensor or tilt sensor 36, and which is defined and is suitable for determining a numerical measure for the bracing state or the lifting state of the chassis. For this purpose the evaluation unit comprises a comparator for carrying out a comparison of the at least one actual measure for the position or tilt of the running gear part with a respective specified target value, whose output signal forms the numerical measure for the bracing state or the lifting state of the chassis.

Figure 3B:
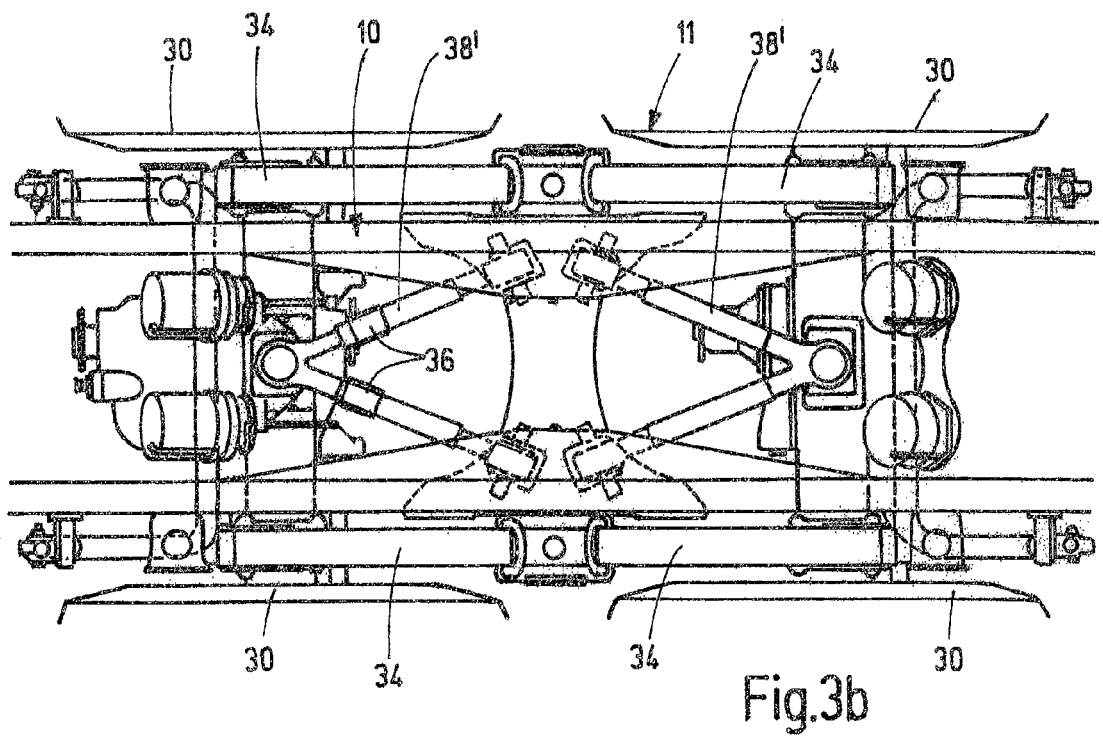

With the exemplary embodiment shown in FIG. 2 the tilt sensor 36 is disposed as an example on the stabilizer on the front axle side as running gear part 38, whereas in the case of FIGS. 3a and 3b the at least one tilt sensor 36 is disposed on a rear axle triangular control element as running gear part 38'. Furthermore, with the embodiment shown in FIG. 4 as an example, each position sensor 36 in the form of a distance sensor is disposed in the area of a distance-changing running gear part in the form of a wheel suspension element 40 (left) and of a shock absorber 40' (right). Here at least one position sensor or tilt sensor 36 is assigned to each of the front and rear supporting struts 20, 22, wherein all the output signals of the position sensors and tilt sensors 36 define the bracing state or the lifting state of the work machine. For increasing the reliability, two redundant position sensors or tilt sensors 36 are assigned to each supporting strut 20, 22 of the bracing device, whose output signals can be combined e.g. in a bridge circuit of the evaluation unit. In principle it is also possible to use a position sensor in the form of a distance sensor or proximity sensor, which is aligned with a reference section that is fixed relative to the vehicle or to the Earth. Conversely, the position sensor can also be disposed at a point that is fixed relative to the chassis, which can be aligned with a reference section that is fixed relative to the running gear or to the Earth. The reference section or the attachment point for the position sensor (not shown) that is fixed relative to the running gear can be disposed on a shock absorber or on a wheel suspension element here. As a distance sensor, advantageously an ultrasonic source or a laser light source is used as a signal source.

In summary, the following should be noted: the invention relates to a mobile work machine with a chassis 10 having a running gear 11 and a bracing device disposed on the chassis 10 that can be supported on a base 28 for raising the chassis 10. The invention is further based on the fact that the running gear 11 comprises at least one running gear part 38, 38' that is variable in terms of its relative position and/or tilt relative to the chassis 10 during the bracing process. According to the invention it is proposed that at least one position sensor or tilt sensor 36 is disposed on the running gear part 38, 38', whose output signal forms an actual measure for the position or the tilt of the running gear part 38, 38' relative to a reference system that is fixed relative to the chassis or to the Earth. In addition, an evaluation unit that is responsive to the output signal of the at least one position sensor or tilt sensor is provided. Advantageously, the evaluation unit comprises a comparator for carrying out a comparison of the at least one actual measure for the position or tilt of the running gear part 38, 38' with a respective specified target value, whose output signal forms a numerical measure for the bracing state or lifting state of the chassis 10.

REFERENCE CHARACTER LIST 10 chassis
11 running gear
12 boom base
14 concrete distribution boom
16 thick matter pump
18 material feed container
20 front supporting strut (support)
22 rear supporting strut (support)
24 foot part
26 foot part
28 floor (base)
30 wheels
32 rear axle
34 wheel springs
36 position sensor or tilt sensor
38, 38' running gear part
40 wheel suspension element
40' shock absorber

The invention claimed is:

1. A mobile work machine with a chassis comprising a running gear and a bracing device disposed on the chassis and supportable on a base for raising the chassis, wherein the running gear comprises at least one running gear part that is variable in its position or tilt relative to the chassis during the bracing process, wherein at least one position sensor or tilt sensor is disposed on the running gear part, whose output signal forms an actual measure for the position or the tilt of the running gear part relative to a reference system that is fixed relative to the vehicle or relative to the Earth, and wherein additionally an evaluation unit that is responsive to the output signal of the at least one position sensor or tilt sensor is provided to determine a numerical measure for the bracing state or the lifting state of the chassis.

2. The mobile work machine as claimed in claim 1, wherein the evaluation unit comprises a comparator for carrying out a comparison of the at least one actual measure for the position or the tilt of the running gear part with a respective specified target value, whose output signal forms a measure for the bracing state or the lifting state of the chassis.

3. The mobile work machine as claimed in claim 1, wherein the tilt sensor is disposed on an angle-changing running gear part that is preferably in the form of a control element or of a stabilizer.

4. The mobile work machine as claimed in claim 1, wherein the position sensor is disposed on a distance-changing running gear part that is preferably in the form of a shock absorber or of a wheel suspension element.

5. The mobile work machine as claimed in claim 4, wherein the position sensor is in the form of a distance sensor or of a proximity sensor that is disposed on a reference section that is fixed relative to the chassis or relative to the Earth.

6. The mobile work machine as claimed in claim 1, wherein the position sensor is in the form of a distance sensor or of a proximity sensor that is disposed at a point that is fixed relative to the chassis and that is aligned to a reference section that is fixed relative to the running gear or relative to the Earth.

7. The mobile work machine as claimed in claim 6, wherein the reference section that is fixed relative to the running gear is disposed on a shock absorber or on a wheel suspension element.

8. The mobile work machine as claimed in claim 5, wherein the distance sensor comprises a control cable sensor, an ultrasonic source or a laser light source as a signal source.

9. The mobile work machine as claimed in claim 1, wherein the chassis supports a concrete pump at the rear axle with a material output container and a concrete distribution boom and a delivery line connected to the concrete pump and led over the concrete distribution boom.

10. A mobile work machine with a chassis comprising a running gear and a bracing device disposed on the chassis and supportable on a base for raising the chassis, wherein the running gear comprises at least one running gear part that is variable in its position and tilt relative to the chassis during the bracing process, wherein at least one position sensor and at least one tilt sensor are disposed on the running gear part, whose output signals form an actual measure for the position and the tilt, respectively, of the running gear part relative to a reference system that is fixed relative to the vehicle or relative to the Earth, and wherein additionally an evaluation unit that is responsive to the output signal of the at least one position sensor and the at least one tilt sensor is provided to determine a numerical measure for the bracing state or the lifting state of the chassis.

* * * * *